US012791209B2

(12) United States Patent
Wiser, III et al.

(10) Patent No.: US 12,791,209 B2
(45) Date of Patent: Nov. 10, 2026

(54) SCRIMLESS AND/OR ARAMID FILTER MEDIA

(71) Applicant: Environmental Management Confederation, Inc., Princeton, NJ (US)

(72) Inventors: Forwood C. Wiser, III, Kingston, NJ (US); Benjamin Hans Kaeppner, Hawkesbury (CA)

(73) Assignee: Environmental Management Confederation, Inc., Princeton, NJ (US)

( * ) Notice: Subject to any disclaimer, the term of this patent is extended or adjusted under 35 U.S.C. 154(b) by 306 days.

(21) Appl. No.: 18/752,087

(22) Filed: Jun. 24, 2024

(65) Prior Publication Data

US 2024/0342640 A1 Oct. 17, 2024

Related U.S. Application Data

(63) Continuation-in-part of application No. 16/532,253, filed on Aug. 5, 2019, now abandoned.

(60) Provisional application No. 62/714,482, filed on Aug. 3, 2018.

(51) Int. Cl.

| | |
|---|---|
| ***F24F 8/192*** | (2021.01) |
| ***B01D 39/16*** | (2006.01) |
| ***B01D 46/00*** | (2022.01) |
| ***B01D 46/16*** | (2006.01) |
| ***B03C 3/155*** | (2006.01) |
| ***B03C 3/34*** | (2006.01) |
| *B01D 46/121* | (2022.01) |
| *B01D 53/22* | (2006.01) |

(52) U.S. Cl.

CPC .......... *F24F 8/194* (2021.01); *B01D 39/1623* (2013.01); *B01D 46/16* (2013.01); *B03C 3/155* (2013.01); *B03C 3/34* (2013.01); *F24F 8/192* (2021.01); *B01D 46/0032* (2013.01); *B01D 46/121* (2022.01); *B01D 2053/222* (2013.01); *B01D 2239/0435* (2013.01); *B01D 2239/064* (2013.01); *B01D 2239/0654* (2013.01); *B01D 2255/802* (2013.01)

(58) Field of Classification Search

None

See application file for complete search history.

(56) References Cited

U.S. PATENT DOCUMENTS

| | | | | |
|---|---|---|---|---|
| 8,795,601 B2 * | 8/2014 | Wiser | B03C 3/09 | 422/186.3 |
| 2006/0172639 A1 * | 8/2006 | Yamada | B01D 39/2017 | 442/59 |
| 2012/0073253 A1 * | 3/2012 | Bishop | B01D 39/1623 | 55/495 |

* cited by examiner

*Primary Examiner* — Gabriel E Gitman

(74) *Attorney, Agent, or Firm* — Schott, P.C.

(57) ABSTRACT

An active field polarized filter includes a scrimless filter media that includes a mixture of polypropylene fibers with polymethaphenylene isophtalamide fibers. This mixture may be in the form of a nonwoven material having a weight ratio of polymethaphenylene isophtalamide fibers to polypropylene fibers ranging between 5:95 and 50:50, and even more preferably between 10:90 and 30:70.

16 Claims, 6 Drawing Sheets

| Test No. | Test Standard | Multi-Layer Media Desc. | Total tribo media wt. | Test Flow cfm | Initial PD in.w.g. | Final PD in.w.g. | E1 | E2 | E3 | MERV | Max 0.3 Efficiency | Min 0.3 Efficiency |
|---|---|---|---|---|---|---|---|---|---|---|---|---|
| 1 | ASHRAE Standard 52.2-2007 | NS-330-MAP | 330g | 1968 | 0.41 | 1.40 | 78% | 96% | 100% | 14 | 97% | 67% |
| 2 | ASHRAE Standard 52.2-2017 | NS-225-AB | 225g | 1968 | 0.350 | 1.40 | 77% | 94% | 99% | 14 | 95.8% | 67.5% |
| 3 | ASHRAE Standard 52.2-2007 | NS-270-MAP | 270g | 1968 | 0.36 | 1.40 | 72% | 93% | 100% | 13 | 94.6% | 61.1% |
| 4 | ASHRAE Standard 52.2-2007 | NS-200-AB | 200g | 1968 | 0.370 | 1.40 | 71% | 92% | 100% | 13 | 95.2% | 61.4% |
| 5 | ASHRAE Standard 52.2-2007 | WS-250-MAP | 250g | 1968 | 0.470 | 1.40 | 67% | 95% | 98% | 13 | 94.8% | 49.6% |
| 6 | ASHRAE Standard 52.2-2007 | WS-200-MAP | 200g | 1968 | 0.300 | 1.40 | 65% | 96% | 100% | 13 | 94.0% | 51.8% |
| 7 | ASHRAE Standard 52.2-2007 | WS-200-MAP | 200g | 1968 | 0.310 | 1.40 | 65% | 95% | 99% | 13 | 90.2% | 54.5% |
| 8 | ASHRAE Standard 52.1-1992 | WS-350-MAP | 350g | 1968 | 0.410 | 1.40 | 59% | 90% | 100% | 13 | 94.9% | 48.8% |

Notes:

1. BHT is Blue Heaven technologies, in Louisville, Ky.
2. NS pre-fix denotes no scrim on the media.
3. WS pre-fix denotes a scrim on the media.
4. MAP suffix denotes a mod-acrylic/polypropylene blend.
5. AB suffix denotes and aramid blend.
6. Test Flow cfm was 1968 cfm for all tests.

*FIG. 11*

SCRIMLESS AND/OR ARAMID FILTER MEDIA

BACKGROUND

Air filters usually use one or more layers of filter media in the path of airflow in order to capture particles. The air passes through the media and airborne particles are collected by the media fibers. The filter media may be made from many materials, and certain filter materials, for example some nonwovens, are attached to a scrim, or base layer, because they are incapable of holding their shape without support. A scrim layer may be loosely woven open layers in a pattern or nonwoven. Nonwoven scrims may include densely packed structures and place yarns at angles that leave openings therebetween. Yarn density (yarns per inch in one direction) in nonwoven scrims may range from one to 20 per inch, however, the volume of nonwoven scrims falls in the one to 10 yarns per inch category. Theoretically, nonwoven scrims can reach the packing density of the yarn since there is no interlacing to interfere with yarn placement. Although many scrims are produced with yarns at right angles (as in woven structures), nonwoven processes can place yarns at various angles and can lay down multiple layers of yarns with various orientations.

Although there are exceptions, the basic difference between a woven fabric scrim and a nonwoven scrim is that weaving requires an under-and-over interlacing, whereas in nonwoven scrims the yarns lay on top of each other and are held together chemically. One of the most significant differences is the "straightness" of yarns in nonwoven scrims. In the nonwoven, yarn properties are translated more directly into fabric properties since the "uncrimping" elongation and yarn/yarn friction associated with woven geometry are largely absent. Further, in nonwoven scrims, the yarns may be locked in place and can't collapse in the way a classic woven lattice does.

Most nonwoven scrims use multifilament yarns of polyester, nylon, glass, rayon or polypropylene. Multifilament yarns are available, cost-effective, relatively easy to process, tend to spread out and provide a desirable "flat" profile and provide good translation of polymer properties to yarn form. Monofilaments are used, but their relative stiffness can create processing problems such as low binder adhesion.

With either woven or nonwoven scrim, filter layers may be attached to the scrim by needle punching fibers onto the scrim or using chemical, heat, resin, or stitch-bonding.

Scrim-material filter media have been widely used for many years and offer many benefits. However, the scrim itself will contribute to pressure drop and energy consumption while adding little or nothing to removal efficiency. And, as will be seen below, it has other disadvantages.

In other filter fields, the principal of electrostatic attraction has been used for many years to enhance the removal of contaminants from air streams. There are three primary categories of air electrostatic cleaners: electrostatic precipitators, passive electrostatic filters and active-field/polarized-media air cleaners, which are sometimes known under different terms.

Electrostatic precipitators charge particles and then capture them on oppositely charged and/or grounded collection plates.

A passive electrostatic filter (also known as an electret) employs a media (or combination of different media) that through some combination of treatment and/or inherent properties has an electrostatic charge. Particles entering the filter media that have an electrostatic charge and/or sites of relative charge are attracted to the charged media filter materials that have the opposite electrostatic charge.

An active-field/polarized-media air cleaner uses an electrostatic field created by a voltage differential between two electrodes. A substantially dielectric filter media is placed in the electrostatic field between the two electrodes. The electrostatic field polarizes both the media fibers and the particles that enter, thereby increasing the capture efficiency and loading ability of the media and the air cleaner. A dielectric material is an electrical insulator or a substance that is highly resistant to electric current that can also store electrical energy. A dielectric material tends to concentrate an applied electric field within itself and is thus an efficient supporter of electrostatic fields.

A further electrostatic air filter design is disclosed in Canadian Patent No. 1,272,453, in which a disposable rectangular cartridge is connected to a high-voltage power supply. The cartridge consists of a conductive inner center screen, which is sandwiched between two layers of a dielectric fibrous material (either plastic or glass). The two dielectric layers are, in turn, further sandwiched between two outer screens of conductive material. The conductive inner center screen is raised to a high-voltage, thereby creating an electrostatic field between the inner center screen and the two conductive outer screens that are kept at an opposite or ground potential. The high-voltage electrostatic field polarizes the fibers of the two dielectric layers.

The air cleaners may be installed in a variety of configurations and situations, both as part of a heating ventilating and air conditioning (HVAC) system and in standalone air moving/cleaning systems. In smaller HVAC systems (e.g. residential and light commercial), the air cleaner panels are often installed in a flat configuration (perpendicular to the airflow) or in angled filter tracks. In larger systems, banks of air cleaner panels are typically arranged in a V-bank configuration where multiple separate panels are positioned to form an air cleaner modular assembly perpendicular to the axis of airflow.

U.S. Pat. Nos. 7,708,813; 8,252,095; 8,795,601; and 9,764,331, the contents of which are incorporated by reference as if full set forth herein, show, among other things:

1) A filter media that includes two layers of fibrous dielectric material (such as polyester) with a higher resistance air permeable material (such as a fiberglass screen) sandwiched between the lower resistance dielectric (polyester) layers;
2) A filter media that includes a layer of fibrous dielectric material forming a mixed fiber layer having fibers from different ends of the triboelectric series of materials (triboelectric scale) for use in an active-field/polarized-media air cleaner;
3) A filter media that includes a layer of relatively lower density dielectric material (such as fibrous polyester), followed by a layer of relatively higher density material (such as denser fibrous polyester); and 4) the use of triboelectric materials as a filter material in an electrostatic field.

In all configurations of an active-field, polarized media air cleaner, the electrostatic field significantly enhances the particle capture and loading abilities of the media. However, in certain standardized tests (e.g. ASHRAE 52.2) and in certain industrial settings, there are dusts that are highly conductive. These will create a path for the voltage to travel between electrodes and no electrostatic field will be present. Therefore, the performance of a media for an active-field/polarized-media air cleaner after the loss of the field is an important factor in the rating and use of the overall system.

Thus, there exists a need for an improved filter material for use in an active field polarized air filter.

SUMMARY OF THE INVENTION

The invention is embodied in several individual improvements to filter media for active-field/polarized-media air cleaners and combinations thereof. It has been found that a scrimless media, by which it is meant a filter media with no attached backing, is able to maintain sub-micron particle efficiency better than medias of the same or greater fiber weight, with a scrim. The scrimless media layer(s) may be of a triboelectric blend that has its own structural integrity, such as an aramid blend, or the scrimless layer(s) may be in an assembly of layers that provide the necessary support. In one embodiment of the invention, the individual features include the following: an active-field/polarized-media air cleaner as described below and including an aramid blend and/or other triboelectric material filter media that may be scrimless and may include a mixture of polypropylene fibers with polymethaphenylene isophtalamide fibers.

This mixture may be as described in U.S. Pat. No. 6,328,788 incorporated by reference as if fully set forth herein, and sold under the tradename TEXEL, and as described in that patent, preferably in the form of a nonwoven material having a weight ratio of fibers (2) to fibers (1) ranging between 5:95 and 50:50, and even more preferably between 10:90 and 30:70.

In another embodiment of the invention: an active-field/polarized-media air cleaner as described below and including the scrimless triboelectric layer(s) that may have no structural integrity of their own and are held in place by other layers of the media pad assembly.

BRIEF DESCRIPTION OF THE DRAWINGS

FIG. 11 shows a variety of air cleaner assemblies all of which have essentially the same configuration and plus a layer or layers of a tribo-electric media.

DETAILED DESCRIPTION

Filter Hardware

Figure 1:
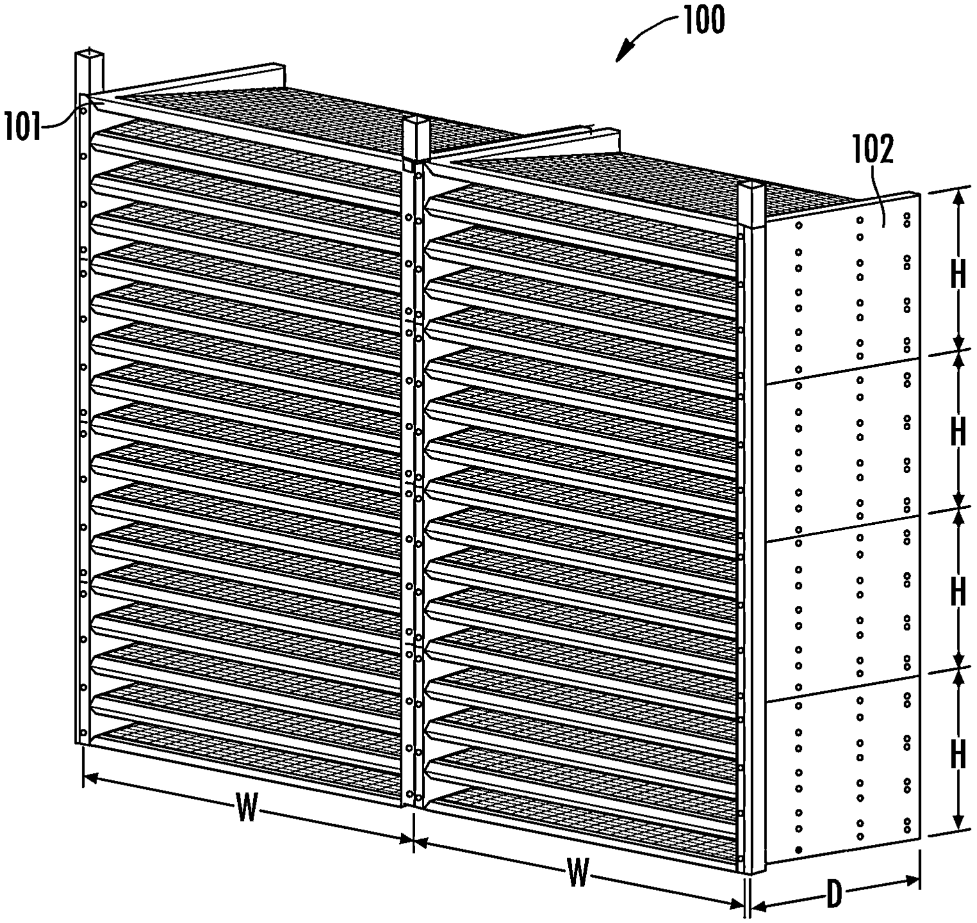
FIG. 1 is an isometric drawing of a plurality of active-field/polarized-media air cleaner panels arranged in a V-bank configuration.

FIG. 1 shows a plurality of active-field/polarized-media air cleaner panels (filters) 101, arranged in a V-bank configuration 100. The individual filter panels 101 may be referred to herein as either a "panel", "filter" and/or an "air cleaner." A plurality of active-field/polarized-media air cleaners 101 are organized into a plurality of stackable modules 102 each module having a width W, a height H and a depth D that is variable, depending on the application. In particular, the V-bank 100 in FIG. 1 contains eight stackable modules 102 each of which contains eight individual active-field/polarized-media air cleaners for a total of 64 air cleaners. Although shown in a V-bank configuration 100, it should be understood that the air cleaners could be inserted individually perpendicular or at other angles to airflow or in other groupings and/or arrangements.

Figure 2:
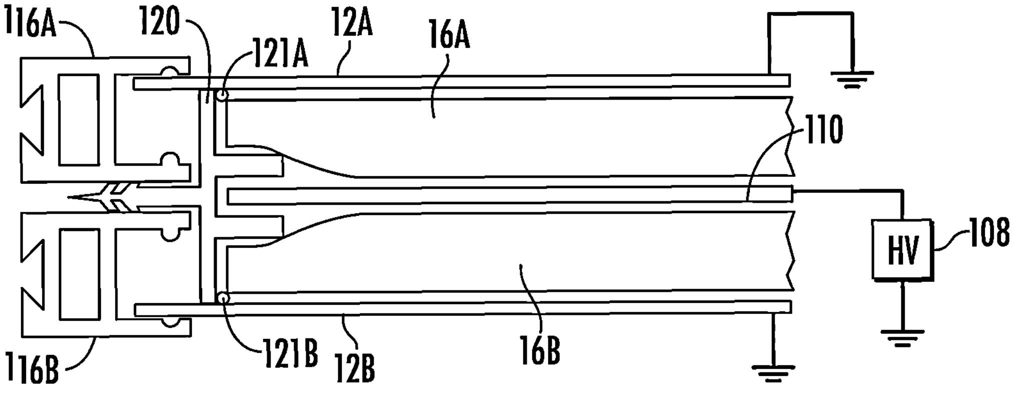
FIG. 2 is an assembly drawing illustrating the use of a dielectric media support frame.

An active-field/polarized-media air cleaner is shown in FIG. 2. A first pad of fibrous dielectric material 16A is disposed above a center screen 110, which as shown extends to the edge of the frame throughout to maximize field coverage but need not so extend. On the other side of the center screen 110 is a second pad of dielectric filter material 16B. The first pad of dielectric filter material is sealed and/or attached, to the dielectric media support frame 120 by a suitable means such as adhesive material 121A, ultrasonic welding or compression. Although sealing the media in the assembly and the assembly in the airstream is critical for maximum single-pass performance, in order to save costs in assembly or for maintenance reasons, filter material may not be sealed, for example, when it is designed for use applications with less stringent performance requirements, such as residential or light commercial buildings.

Above the first pad of dielectric filter material 16A is a first upstream conductive outer screen 12A. Below the second pad of dielectric filter material 16B is a second conductive downstream outer screen 12B (the use of "first" and "second" conductive outer screens may be reversed in the claims in order to introduce the elements in order therein). The second pad of dielectric filter material is attached to the dielectric media support frame 120 by a suitable means, such as adhesive material 121B, ultrasonic welding or compression. The first conductive outer screen 12A is held in place by a first conductive holding frame 116A. The second conductive outer screen 12B is held in place by a second conductive holding frame 116B. Although the outer screens, shown as connection to ground in the figures, are referred to herein as conductive, it should be understood that in some applications, they may include somewhat resistive material.

The filter media itself includes a dielectric media support frame 120, a first pad of fibrous dielectric material 16A, a center screen 110 and second pad of dielectric filter material 16B. The filter holding frame that holds the filter media includes a first conductive or insulative holding frame 116A with a first conductive outer screen 12A, and a second conductive or insulative holding frame 116B with a second conductive outer screen 12B.

In operation, one terminal of a high-voltage power supply 108 is connected to center screen 110. The other terminal of the high-voltage power supply 108 is coupled to the first conductive outer screen 12A and the second conductive outer screen 12B, which is held typically at ground potential.

Particles in the incoming air passing through dielectric filter material 16A and 16B of the active-field/polarized-media air cleaner of FIG. 16 and are polarized by the electric field therein and collected on the first and second pads of dielectric filter material 16A, 16B.

Figure 3:
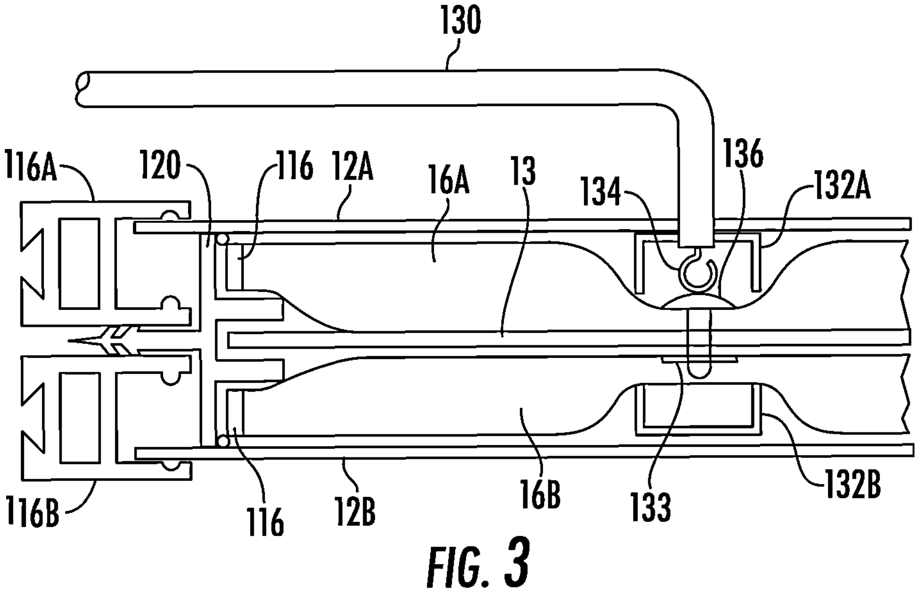
FIG. 3 is an assembly drawing showing a high-voltage probe and high-voltage contact and screen.

A high-voltage contact protected by a high-voltage shield to reliably contact the center screen 110 is shown in FIG. 3. A contact 136 is passed through a hole in the center screen 13 (or such contact could be made to an edge of the screen if this was not desired or practical). A conductive element 133 secures the contact 136 to the center screen 13, which provides a good connection between the contact 136 and the charged electrode or center screen 13. The contact may be a rivet, two-headed slam rivet, screw, bolt, washer, ball, or similar. The common thread between the contacts selected is to broaden the area of contact with the center screen and to provide a broader contact point for the high-voltage electrode. The materials of these components are ideally corrosion resistant and could be metallic or conductive plastic or other material.

A high-voltage probe 130 passes through the conductive outer screen 12A and terminates in a high-voltage contact 134. In some embodiments, a grommet, border, washer(s) may be used to provide an electrically even grounded surface rather the uneven points that may result from cutting a perforated sheet or screen. A high-voltage shield of insulating dielectric material 132A surrounds the high-voltage contact 134. Similarly, a high-voltage shield of insulating dielectric material 132B surrounds lower end of the rivet 136 and the metallic disk 133. Alternatively, the high-voltage probe may be routed on the inside of the conductive outer screens 12A, 12B.

The high-voltage probe 130 may be a variety of materials and types. For example, it may be a rigid wire or flexible. It must be able to conduct a high-voltage, but it may be metallic or composite. It may be one piece or have an end-cap or fitting.

Figure 4:
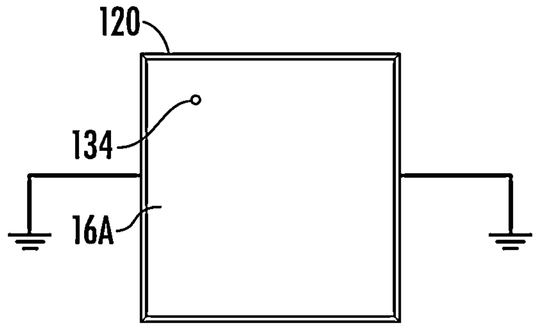
FIG. 4 illustrates the use of the dielectric media support frame.

FIG. 4 shows a top view of the filter media in FIG. 3. A dielectric media support frame 120 surrounds the pad of dielectric filter material 16A. The rivet or attachment means 136 passes through the pad of dielectric filter material 16A.

Figure 5:
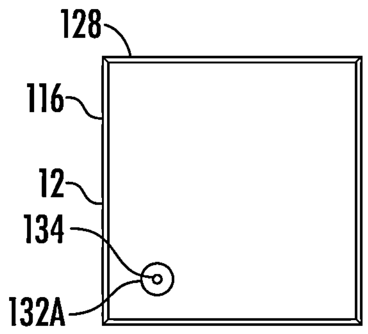
FIG. 5 shows a rigid conductive outer screen and conductive holding frame including a high-voltage probe and high-voltage contact shield.

FIG. 5 shows a top view of the frame that holds the filter media. Four conductive outer filter holding frame pieces 116 and four end corners 128 form a frame to hold the conductive outer screen 12. The high-voltage contact 134 is positioned within the insulating high-voltage shield 132A.

In operation, when the conductive outer filter holding frames 116A and 116B (FIG. 3) are closed around the filter media (120, 16A, 13 and 16B) the high-voltage contact 134 contacts the head of the rivet 136. Also, the high-voltage shields 132A and 132B slightly compress the pads of dielectric filter material 16A and 16B. The high-voltage contact 134 assures a reliable connection with the head of the rivet 136. The insulating high-voltage shields 132A, 132B reduce the possibility of spraying and corona from the tip of the high-voltage contact 134. Furthermore, the insulating high-voltage shields 132A, 132B reduce the chances of arcing from the high-voltage contact 134 to the conductive outer screens 12A and 12B.

In one embodiment of the current invention, the high-voltage contact 134 is typically made of rigid wire or other resilient material. In making contact with the head of the rivet 136, the center screen 13 may flex slightly. Alternatively, the high-voltage contact 134 can be a spring contact to reduce the flexing of the center screen 13. Alternative arrangements for the contact area 136 on the center screen 13 include a conductive disk on the top side of the center screen 13, a pair of conductive elements, one on the top and the other on the bottom of the center screen, with a fastener passing through the center screen and holding the two discs together. The rigidity of the high-voltage probe 134 or the rigidity of the external conductive outer screens or both in conjunction force a positive mechanical contact between the end of the high-voltage probe 134 and the disc or disc/rivet combination 136. The result is a firm contact that cannot be compromised by vibration, or media movement or center screen (electrode) movement.

In another embodiment of the invention, the high-voltage probe may be attached either permanently or removably (e.g. with two-piece snap or ignition nut/connector) to the center screen in its center, on an edge or other manner such that it conducts current.

In another embodiment of the invention, magnets 202, 204 may be displaced so as to facilitate a secure and aligned high-voltage contact. Alternatively, parts of the high-voltage probe 130 and contact 136 could made of magnetic materials.

Figure 6:
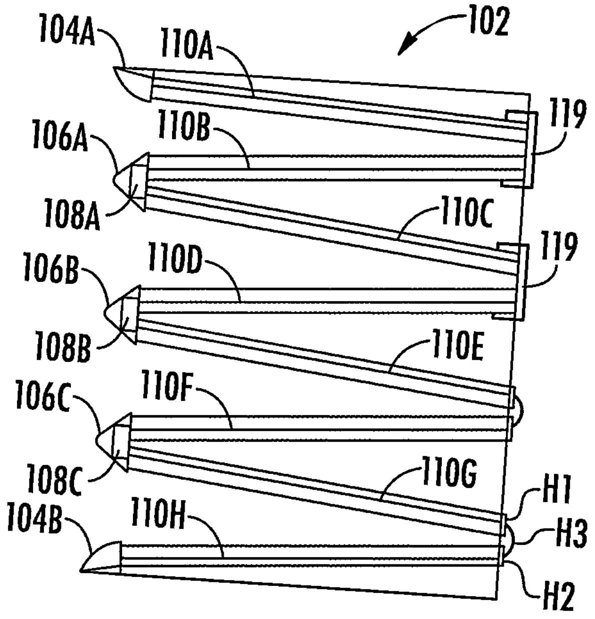
FIG. 6 is a cross-sectional view of a plurality of active-field/polarized-media air cleaner filters arranged in a V-bank configuration.

A cross-sectional view of an individual module 102 from FIG. 1 is shown in FIG. 6. Each of the individual active field, polarized media air cleaners 110A, 110B, 110, 110D, 110E, 110F, 110G and 110H are held in place in a V-bank formation. At the front of the module 102 a plurality of cowlings holds each filter in place. In particular, there are two end cowlings 104A and 104B at the top and bottom of module 102. In between the two end cowlings, there are three middle cowlings 106A, 106B and 106C. The aerodynamic shape of the cowlings provides for a lower form drag airflow thereby reducing the static (air resistance) of the filter.

At the rear of the module 102 (FIG. 6) a plurality of double hinges may hold each filter in place, or the upper and lower frames 114*a*, 114*b* may be held in place in a receiving channel 119 in a press fit, or the entire filter air cleaner 110A, etc. may be contained in a self-contained cartridge that cannot be accessed absent further effort like screw removal or destructive force.

Figure 7:
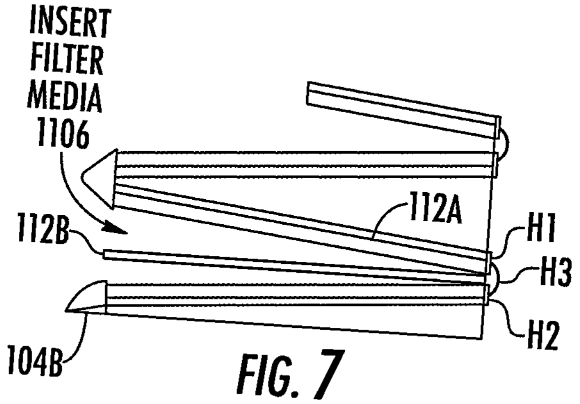
FIG. 7 is a detailed portion of a cross-sectional view of a plurality of active-field/polarized-media air cleaner filters arranged in a V-bank configuration illustrating insertion of replacement filter media into a lower filter holding frame.
Figure 8:
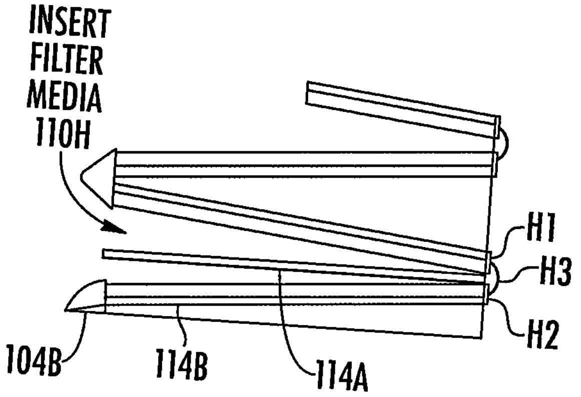
FIG. 8 is a detailed portion of a cross-sectional view of a plurality of active-field/polarized-media air cleaner filters arranged in a V-bank configuration illustrating insertion of replacement filter media into an upper filter holding frame.

In the hinged embodiment, each double hinge is comprised of three hinges H1, H2 and H3, better seen in operation in FIGS. 7 and 8. As shown in FIG. 7, the first hinge H1 has a first attachment point coupled to an upper frame 112A, and a second attachment point coupled to a lower frame 112B. The hinge H1 has a pivot point that permits the lower frame 112B to rotate away from the upper frame 112A so as to allow a replacement filter media to be inserted into the active-field/polarized-media air cleaner 110G. Similarly, as shown in FIG. 8, the second hinge H2 has a first attachment point coupled to an upper frame 114A, and a second attachment point coupled to a lower frame 114B. The hinge H2 has a pivot point that permits the upper frame 114A to rotate away from the lower frame 114B so as to allow a replacement filter media to be inserted into the active-field/polarized-media air cleaner 110H.

A third hinge H3 as a first attachment point coupled to the first hinge H1 and a second attachment point coupled to the second hinge H2. The third hinge H3 has a third pivot point such that the upper active-field/polarized-media air cleaner frame (112A, 112B) can rotate as a unit with respect to the lower active-field/polarized-media air cleaner frame (114A, 114B). The use of double hinges at the rear of module 102 provides for flexibility in mounting active-field/polarized-media air cleaners at different angles with respect to each other. The double hinge at the rear of the module 102 also provides a good air seal at the rear of the filters regardless of the different angles for mounting individual air cleaners. The positive seal provided by the double hinge at the rear of the filters reduces blow by, i.e. the portion of the air stream passing by the filter arrangement without passing through the filter media.

Further the incoming air could be pre-treated with an electrostatic field and/or ionization to further influence particle size distribution, collection and agglomeration on the filter media.

While the inventions described above have made reference to various embodiments, modifications can be made to the structure and elements of the invention without departing from the spirit and scope of the invention as a whole. For example, panels may be employed individually or in arrays that are either fixed and/or partially or fully removable, slide into tracks. The panels be made from a variety a materials, employ a variety of voltages, spacings, and electrostatic field strengths.

Filter Media

Figure 9:
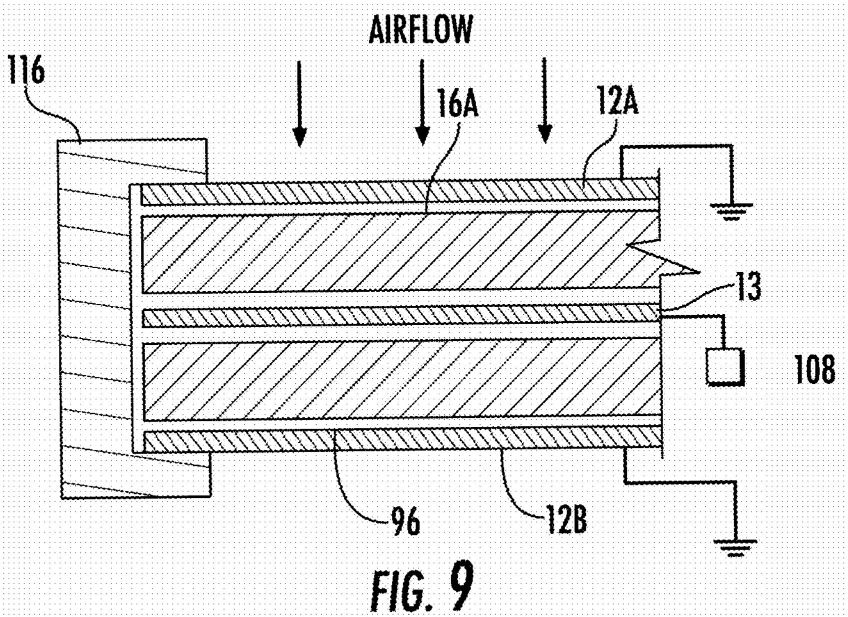
FIGS. 9 and 10 show different cross sections through the frame in FIG. 4, with a detailed view of the filter material layering.
Figure 10:
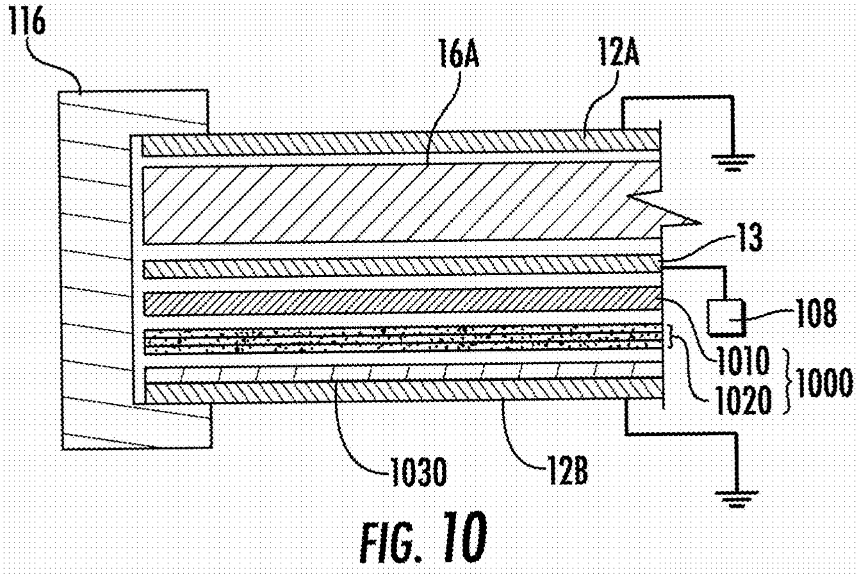

FIGS. 9 and 10 show different cross sections through the frame in FIG. 4, with a detailed view of the filter material layering.

As shown in FIG. 9, the frame member 116 holds three or more layers within it, an upstream layer 16A that may or may not include a triboelectric fiber blend, already described herein, and by reference and a center screen 13. The frame member 116 may also include a scrimless aramid layer 96 that includes mixture of polypropylene fibers with polymethaphenylene isophtalamide or other aramid fibers. This mixture may be as described in U.S. Pat. No. 6,328,788, the contents of which are incorporated by reference as if fully set forth herein, and sold under the tradename TEXEL, and as described in the patent, preferably in the form of a nonwoven material having a weight ratio of polymethaphenylene isophtalamide fibers to polypropylene fibers ranging between 5:95 and 50:50, and even more preferably between 10:90 and 30:70. Aramids are generally prepared by the reaction between an amine group and a carboxylic acid halide group. The most well-known aramids (Kevlar, Twaron, Nomex, New Star and Teijinconex) are AABB polymers. Other aramids contain predominantly the meta-linkage and are poly-metaphenylene isophthalamides (MPIA). Kevlar and Twaron are both p-phenylene terephthalamides (PPTA), the simplest form of the AABB para-polyaramide. PPTA is a product of p-phenylene diamine (PPD) and terephthaloyl dichloride (TDC or TCI).

In use, because of the strength of the aramid, the product described by U.S. Pat. No. 6,328,788 may not require a scrim layer. This can also reduce pressure drop.

By placing the aramid layer 96 downstream of the layer 16A, the filter may first capture larger particulate in the coarser filter, then the finer particles, all while minimizing pressure drop. The layers could be swapped however, or the general layer or layers of 16A may not be present and substituted for other, possibly aramid, layers. It should be understood herein that the aramid layer 96 is a triboelectric material, but separately indicated from the more general layer 16A that may or may not contain a triboelectric blend.

FIG. 10 shows another embodiment in cross section, which may include the similar layers to FIG. 9 and center screen 13. In addition to these, there is a scrimless filter layer assembly 1000 that includes a top support layer 1010, scrimless media layer 1020, and bottom support layer 1030. The support layers provide both structural support in the sense that they give shape to the filter media (the screens can also do this), but also they prevent the aramid layer from blowing apart or otherwise losing its shape when subject to airflow and/or contact.

The scrimless media layer 1020 may include a nonwoven fiber blend that would otherwise be both fragile and not structurally sound enough to hold its shape in use in a filter assembly (absent scrim) but possess excellent filtration qualities otherwise. Examples of such materials include a mod-acrylic and polypropylene blend and/or other triboelectric or non-triboelectric blends. The scrimless layer may also be of a single type of material. The function of the support layer(s) is to keep the scrimless layer(s) intact in manufacture, handling, and use, without any bonding (glue, stitching, or otherwise) between the support layers 1010, 1030 and the scrimless media layer 1020.

The scrimless media layer 1020, which may be one or more layers as shown or include other combinations that help the scrimless media layer 1020 hold its shape and are more durable because of the support of the top support layer 1010 and bottom support layer 1030. The top support layer may be a variety of materials, but is ideally a durable and relatively low-pressure drop, woven. nonwoven or perforated material such as polyester, polypropylene, nylon, other plastic or composite, glass, wool, extruded netting, etc.

The bottom support layer 1030, which may be subject to more contact during installation of a support frame 1020 (and may not necessarily be on the "bottom"), may be a woven, nonwoven or perforated material, plastic netting, vinyl screen, metal screen or even a scrimmed material, or other supportive material. It may also function as the external conductive screen in an assembly. The above descriptions are those currently described but other support layers may be possible.

In forming the scrimless media layer 1020, a layer of scrimmed material may have its scrimmed backing removed, leaving only the media that can be used as the scrimless media layer.

The layers in the cross sections shown in FIGS. 9 and 10 or conductive ground screen may not necessarily be uniform, or single layers, and may include:

vinyls;
polyesters;
glass
wools;
an aramid and a material from the other side of the triboelectric scale;
the above including additionally polypropylene;
the above as described in U.S. Pat. No. 6,328,788 and/or sold as TEXEL;
the above with or without scrim;
any of the above as part of a layered media wherein other layers could any of the above;
any other filter material triboelectric or not;
any of the above plus an arc block layer;
any of the above with PCO;
and combinations thereof.

In a further embodiment of the invention, one of the layers of media could be treated with a photocatalytic material. The air cleaner could then be coupled with a UV light for the breakdown of gas phase contaminants. Hydroxyls produced in this embodiment could inactivate biologicals and breakdown gas phase contaminants. In such an embodiment, under the influence of UV light, the media creates hydroxyl radicals and super-oxide ions to react with the captured and airborne bioaerosols and gas phase contaminants. The photocatalytic layer could be the furthest downstream layer. This would keep it substantially free of particle contamination.

In a further embodiment of the invention, the external screen/electrode of the filter frame is treated with the photo catalyst.

In a further embodiment of the invention, some or all of the conductive screen(s) (center or ground) would have odor/gas phase contaminant adsorbing properties, such as a carbon impregnated foam or mesh.

In a further embodiment of the invention, one or more layers could be a material treated with a catalyst for breaking down VOC's, other reactive gas phase contaminants and/or Ozone and/or biological contaminants.

In a further embodiment of the invention, one or more layers contain fibers that are adsorbtive or chemisorptive and/or carry a coating that is absorptive or chemisorptive.

In a further embodiment of the invention, one or more layers contain fibers that are biocidal and/or carry a coating that is biocidal.

Test Results

Table 1 shows various third-party testing that compares results in an ASHRAE Standard 52.2 test. The 52.2 test measures upstream and downstream efficiency in twelve size ranges from 0.3 to 10.0 microns. In the course of the test, multiple efficiencies are taken as the device is loaded with a test dust that includes a high percentage of carbon black and is highly conductive, unlike typical atmospheric dust. The minimum efficiencies achieved are put into three groups: E1 (0.3 to 1.0 micron), E2 (1.0 to 3.0 micron), and E3 (3.0 to 10.0 micron). The individual results in each size within the group are averaged together. The efficiency ratings are based on the average number achieved in each category and result in the Minimum Efficiency Reporting Value (MERV) rating for the device. For high-efficiency air filters and cleaners, the E1 efficiency is critical. In the case of an active-field/polarized media air cleaner, the conductive dust causes the voltage to travel from the center screen to the ground screen, shorting the system and de-energizing the electrostatic field and thus its effects on the particles and media fibers. It is important to note that filter ratings are based on 10% or less variations in the E1 efficiency. Therefore small improvements in sub-micron particle removal are important and have a large impact on the suitability and use of products for certain markets. For example, most filtration in hospitals must meet a minimum of MERV 14, with an E1 between 75% and 85%.

FIG. 11 shows a variety of air cleaner assemblies all of which have essentially the same configuration and plus a layer or layers of a triboelectric media. They are ranked according to the E1 result in a Standard 52.2 test. The assemblies that employ a scrimless media perform considerably better than medias of similar or greater triboelectric media weight with a scrim. This is particularly true in the critical sub-micron range. For example, the most striking comparison is between tests 1 and 8. Here, 350 g of triboelectric media with a scrim is contrasted with 330 g of triboelectric media without a scrim. The scrimless media is almost 20% better in both E1 efficiency and minimum 0.3-micron performance. Every comparison of scrimmed v. scrimless media shows essentially the same relationship. In all cases, the difference is most pronounced in the sub-micron/E1 range, with the E2 and E3 being essentially the same. Further, on a per weight and pressure drop basis, the scrimless media of an aramid blend generally outperforms the scrimless modacrylic/polypropylene blend. The invention(s) disclosed above could be used in variety of ways, including, but not limited to, use in HVAC systems, self-contained filter/fan units, and industrial air cleaning systems, and dust collectors. While the above embodiments primarily describe flat filter configurations, the inventions could be adapted to other configurations as well, including but not limited to V-bank groupings of multiple flat panels, interconnected groupings of panel and V-Bank units, bag filters, pleated and mini-pleated filters, cartridge filters, and cylindrical filters for dust collection systems.

As per ASHRAE 170 and all local codes, hospitals are required to use air filters that have an efficiency of MERV 14 or greater (as per ASHRAE 52.2) in most areas of their facilities. This is a stringent requirement, and the only way the inventor could achieve this target and achieve an acceptable pressure drop was by using the scrimless filter media described herein.

When they used scrimmed media like those in the cited Wiser reference, U.S. Pat. No. 8,795,601, they could not meet the MERV 14 requirement at acceptable operation pressure drops. In the ASHRAE 52.2 testing procedure, there is a requirement for loading a highly conductive dust into the airstream. This conductive dust is not representative of typical atmospheric dust and causes the electro-static field in the air cleaner (as shown in U.S. Pat. No. 8,795,601, for example) to dissipate and the system to lose efficiency, which briefly drops to an unacceptable low, before climbing again. The media used in 8,795,601 were standard triboelectric media that was needle punched onto a scrim layer—as are virtually all standard media. Increasing the layers and density of this media did not allow the inventor to achieve the efficiency requirement at acceptable pressure drop.

The inventor could meet the MERV 14 standard without using the conductive dust, but that is not technically the actual standard.

In seeking to solve this issue, the inventor experimented with various media materials. One that he found that performed exceptionally well was the Texel media. This had lower pressure drop (expected) and higher efficiency for the same gram weight/density of material vs other triboelectric materials. It used strong fibers (aramid) and was cross-lapped (essentially needle punched to itself). At first, we attributed this to the blend of materials. But in taking standard triboelectric media and peeling off the scrim, he found the same thing: peeled layers of material had a higher efficiency than the same layers unpeeled. This was certainly unexpected, taking filtering layers out of a media should make it less efficient.

Further, in a standard ASHRAE 52.2 test, the efficiency trough as the field dissipated was not as low. One advantageous element seemed to be that the scrim or support layers not be physically attached to the tribo-electric material in the areas where there is airflow.

When the inventor switched to scrimless filter media, as described in the present application, we met the ASHRAE standards following the ASHRAE procedure.

Of further importance in passing the ASHRAE test, the scrimless filter media provides less pressure drop. Using the previous scrimmed media, the drop through the filter was 0.48"w·g at design airflow. When we substituted the same media, but scrimless, the airflow was 0.4" w·g and it was slightly more efficient. This allowed us to pass the ASHRAE 52.2 test and achieve a MERV 14 rating.

While the inventions described above have made reference to various embodiments, modifications can be made to the structure and elements of the invention without departing from the spirit and scope of the invention as a whole. In particular, various layers or elements could be combined, interchanged, and/or repeated to achieve various effects. For example, while one figure shows the basic concept of the air cleaner, another figure shows the configuration of one type of assembled system. While for the sake of clarity, the various elements have been shown as separate layers, two or more of the "layers" may be combined into a single layer or material.

What is claimed is:

1. An active-field/polarized-media air cleaner, comprising:

a first conductive outer screen;

a second conductive screen substantially parallel to the first conductive outer screen;

a scrimless filter media disposed between the first conductive outer screen and the second conductive screen, wherein the scrimless filter media includes a top support layer, a bottom support layer, and a scrimless media layer located between the top support layer and the bottom support layer, and wherein the top support layer and the bottom support layer are operable to provide a shape to the scrimless filter media, and prevent the scrimless media layer from blowing apart or otherwise losing its shape when subject to airflow therethrough, wherein the top support layer and bottom support layer are not bonded to the scrimless filter media; and a power supply having first and second terminals, the first terminal of the power supply being connected to the first conductive outer screen and the second terminal of the power supply being coupled to the second conductive screen.

2. The active-field/polarized-media air cleaner of claim 1, wherein the scrimless media layer comprises a triboelectric material.

3. The active-field/polarized-media air cleaner of claim 2, wherein the triboelectric material is an aramid.

4. The active-field/polarized-media air cleaner of claim 2, wherein the scrimless media layer includes polypropylene fibers with polymethaphenylene isophtalamide fibers.

5. The active-field/polarized-media air cleaner of claim 4, wherein the scrimless media layer includes a layer of material with a weight ratio of polymethaphenylene isophtalamide fibers to polypropylene fibers ranging between 5:95 and 50:50.

6. The active-field/polarized-media air cleaner of claim 4, wherein the scrimless media layer includes a layer of material with a weight ratio of polymethaphenylene isophtalamide fibers to polypropylene fibers ranging between 10:90 and 30:70.

7. The active-field/polarized-media air cleaner of claim 1, wherein the scrimless media layer comprises mod-acrylic fibers.

8. The active-field/polarized-media air cleaner of claim 1, wherein the scrimless media layer comprises polypropylene blend fibers.

9. The active-field/polarized-media air cleaner of claim 1, wherein the top support layer is a nonwoven material.

10. The active-field/polarized-media air cleaner of claim 9, wherein the nonwoven material is selected from a group consisting of polyester, glass, and wool.

11. The active-field/polarized-media air cleaner of claim 1, wherein the bottom support layer is selected from a group consisting of a nonwoven material, plastic netting, vinyl, and a non-conductive screen.

12. The active-field/polarized-media air cleaner of claim 1, wherein the scrimless filter media is subject to UV light.

13. The active-field/polarized-media air cleaner of claim 1, wherein the scrimless filter media comprises multiple layers, and wherein at least one of the layers is treated by a photocatalyst.

14. The active-field/polarized-media air cleaner of claim 1, further comprising a second conductive outer screen upstream from the second conductive screen and an additional triboelectric filter layer with materials from two sides of a triboelectric scale between the second conductive outer screen and the second conductive screen.

15. The active-field/polarized-media air cleaner of claim 14, wherein the first conductive outer screen, the second conductive screen, the second conductive outer screen, and the scrimless filter media are all contained within a module.

16. The active-field/polarized-media air cleaner of claim 15, wherein the module has a hinge to access the scrimless filter media.

* * * * *